(12) United States Patent
Naughton et al.

(10) Patent No.: US 10,413,980 B2
(45) Date of Patent: Sep. 17, 2019

(54) RECIPROCATING SAW, SUCH AS A JIGSAW (75) Inventors: Michael Naughton, Oconomowoc, WI (US); Troy C. Thorson, Cedarburg, WI (US); Sean T. Kehoe, Waukesha, WI (US); Steven G. Melnyk, Grafton, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 889 days.

(21) Appl. No.: 13/435,554

(22) Filed: Mar. 30, 2012

(65) Prior Publication Data
US 2013/0019483 A1 Jan. 24, 2013

Related U.S. Application Data (60) Provisional application No. 61/470,620, filed on Apr. 1, 2011.

(51) Int. Cl.
B23D 49/16 (2006.01)
B23D 51/01 (2006.01)
B23D 51/16 (2006.01)

(52) U.S. Cl.
CPC ........... *B23D 49/162* (2013.01); *B23D 51/01* (2013.01); *B23D 51/16* (2013.01)

(58) Field of Classification Search
CPC .............................. B23D 51/16; B23D 49/007
USPC ............................................ 30/392–394, 376
See application file for complete search history.

(56) References Cited

U.S. PATENT DOCUMENTS

| 1,102,792 | A |   | 7/1914 | Patton |
|---|---|---|---|---|
| 1,948,109 | A | * | 2/1934 | Hager ........................ 30/272.1 |
| 2,635,651 | A |   | 4/1953 | Hulfish |
| 3,033,252 | A | * | 5/1962 | Atkinson ....................... 30/392 |
| 3,203,490 | A | * | 8/1965 | Short .................... B25D 16/00 173/109 |
| 3,456,698 | A | * | 7/1969 | Csaki .................. B23D 49/162 30/273 |
| 3,863,342 | A |   | 2/1975 | Griffies et al. |
| 3,896,888 | A | * | 7/1975 | Badcock ....................... 173/109 |
| 3,952,239 | A |   | 4/1976 | Owings et al. |

(Continued)

FOREIGN PATENT DOCUMENTS

DE 19647993 5/1998

OTHER PUBLICATIONS

PCT/US2012/0031426 International Search Report and Written Opinion dated Jun. 27, 2012, 18 pages.

(Continued)

*Primary Examiner* — Andrea L Wellington
*Assistant Examiner* — Fernando A Ayala
(74) *Attorney, Agent, or Firm* — Michael Best & Friedrich LLP (57) ABSTRACT

A jigsaw includes a housing having a body portion and a handle portion. The body portion has a forward end and a rearward end. The jigsaw also includes a motor positioned within the body portion of the housing. The motor is located forward of the handle portion. The jigsaw further includes a drive mechanism positioned within the body portion of the housing. The drive mechanism is coupled to the motor for driving a saw blade in a reciprocating motion. The jigsaw also includes a shoe assembly coupled to the body portion of the housing between the forward end and the rearward end.

35 Claims, 13 Drawing Sheets

(56) References Cited

U.S. PATENT DOCUMENTS

| | | | |
|---|---|---|---|
| 3,995,703 A * | 12/1976 | Wanner | 173/105 |
| 4,206,657 A * | 6/1980 | Palm | 74/50 |
| 4,240,204 A | 12/1980 | Walton, II et al. | |
| 4,272,996 A | 6/1981 | Sauerwein | |
| 4,436,163 A | 3/1984 | Simpson | |
| 4,730,397 A | 3/1988 | Weiford et al. | |
| 5,517,763 A | 5/1996 | Schilling et al. | |
| 5,535,520 A | 7/1996 | Armstrong | |
| 5,617,638 A | 4/1997 | Amano et al. | |
| 5,644,846 A | 7/1997 | Darr et al. | |
| 5,680,704 A | 10/1997 | Okubo et al. | |
| 5,727,322 A | 3/1998 | Giacometti | |
| 6,178,646 B1 | 1/2001 | Schnell et al. | |
| 6,230,411 B1 | 5/2001 | Wall et al. | |
| 6,282,797 B1 | 9/2001 | Osada et al. | |
| 6,357,124 B1 | 3/2002 | Wall et al. | |
| 6,357,125 B1 | 3/2002 | Feldmann et al. | |
| 6,553,675 B2 | 4/2003 | Orrico | |
| 6,892,459 B2 | 5/2005 | Okumura et al. | |
| 6,935,939 B1 | 8/2005 | Buser et al. | |
| 7,003,887 B2 | 2/2006 | Wadge | |
| 7,065,884 B2 | 6/2006 | Tam et al. | |
| 7,094,011 B2 * | 8/2006 | Kopras et al. | 409/137 |
| 7,216,433 B2 | 5/2007 | Haas et al. | |
| 7,234,243 B2 | 6/2007 | Tam et al. | |
| 7,246,533 B2 * | 7/2007 | Lagaly et al. | 74/44 |
| 7,296,356 B2 | 11/2007 | Ngan et al. | |
| 7,356,930 B2 | 4/2008 | Wadge et al. | |
| 7,363,713 B2 * | 4/2008 | Hirabayashi et al. | 30/392 |
| 7,497,017 B2 | 3/2009 | Bone et al. | |
| 7,506,407 B2 | 3/2009 | Ishiwata | |
| 7,506,447 B2 | 3/2009 | Wheeler et al. | |
| 7,646,118 B2 * | 1/2010 | Yoshida et al. | 310/60 R |
| 8,579,043 B2 * | 11/2013 | Hirayama et al. | 173/109 |
| 2002/0178589 A1 | 12/2002 | Wong et al. | |
| 2003/0070307 A1 * | 4/2003 | Walker | B23D 51/16 30/374 |
| 2004/0040161 A1 * | 3/2004 | Houben | B23D 51/16 30/392 |
| 2004/0231170 A1 | 11/2004 | Neitzell et al. | |
| 2005/0132582 A1 | 6/2005 | Gudmundson | |
| 2005/0257383 A1 | 11/2005 | Million | |
| 2005/0283984 A1 | 12/2005 | Walmsley | |
| 2006/0064882 A1 | 3/2006 | Wilson et al. | |
| 2006/0185173 A1 | 8/2006 | Wadge et al. | |
| 2007/0050994 A1 | 3/2007 | Imai et al. | |
| 2007/0186425 A1 | 8/2007 | Tam et al. | |
| 2008/0010840 A1 | 1/2008 | Lagaly et al. | |
| 2008/0029282 A1 * | 2/2008 | Ikuta | 173/114 |
| 2008/0041174 A1 | 2/2008 | Lagaly et al. | |
| 2008/0209742 A1 | 9/2008 | Kretschmar et al. | |
| 2008/0235961 A1 | 10/2008 | Chreene et al. | |
| 2008/0289198 A1 | 11/2008 | Kaiser et al. | |
| 2009/0077814 A1 | 3/2009 | Gibbons et al. | |
| 2009/0077818 A1 | 3/2009 | Van Wambeke et al. | |
| 2009/0077819 A1 | 3/2009 | Kuehue et al. | |
| 2009/0223071 A1 * | 9/2009 | Alberti et al. | 30/392 |
| 2009/0236112 A1 * | 9/2009 | Hahn | B25D 17/043 173/162.2 |
| 2010/0180455 A1 * | 7/2010 | Haas | B23D 49/162 30/392 |
| 2011/0010951 A1 * | 1/2011 | Harrison et al. | 30/376 |
| 2012/0192438 A1 * | 8/2012 | Aoki | B23D 51/16 30/392 |

OTHER PUBLICATIONS

Extended European Search Report for Application No. 12764402.9 dated Jul. 9, 2014 (7 pages).

* cited by examiner

RECIPROCATING SAW, SUCH AS A JIGSAW

CROSS-REFERENCE TO RELATED APPLICATIONS

This application claims priority to U.S. Provisional Patent Application No. 61/470,620, filed Apr. 1, 2011 by Michael Naughton et al. and titled "RECIPROCATING SAW," the entire contents of which are incorporated by reference herein.

FIELD OF THE INVENTION

The present invention relates to reciprocating saws and, in particular, to jigsaws.

SUMMARY

In one embodiment, the invention provides a jigsaw including a housing having a body portion and a handle portion. The body portion has a forward end and a rearward end. The jigsaw also includes a motor positioned within the body portion of the housing. The motor is located forward of the handle portion. The jigsaw further includes a drive mechanism positioned within the body portion of the housing. The drive mechanism is coupled to the motor for driving a saw blade in a reciprocating motion. The jigsaw also includes a shoe assembly coupled to the body portion of the housing between the forward end and the rearward end.

In another embodiment, the invention provides a jigsaw including a housing and a motor positioned within the housing. The motor includes an output shaft having a first end and a second end. The jigsaw also includes a drive gear coupled to the first end of the output shaft and a spindle positioned within the housing. The spindle is coupled to the drive gear such that the motor drives the spindle in a reciprocating motion. The jigsaw further includes a clamp mechanism coupled to the spindle adjacent the second end of the output shaft. The clamp mechanism is configured to receive a saw blade to drive the saw blade in the reciprocating motion.

In yet another embodiment, the invention provides a jigsaw including a housing and a motor positioned within the housing. The motor defines a longitudinal axis. The jigsaw also includes a drive mechanism positioned within the housing. The drive mechanism is coupled to the motor for driving a saw blade in a reciprocating motion. The jigsaw further includes a shoe assembly coupled to the housing. The shoe assembly includes a lower surface configured to support the jigsaw on a work piece. The lower surface defines a plane. The longitudinal axis of the motor is generally perpendicular to the plane.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
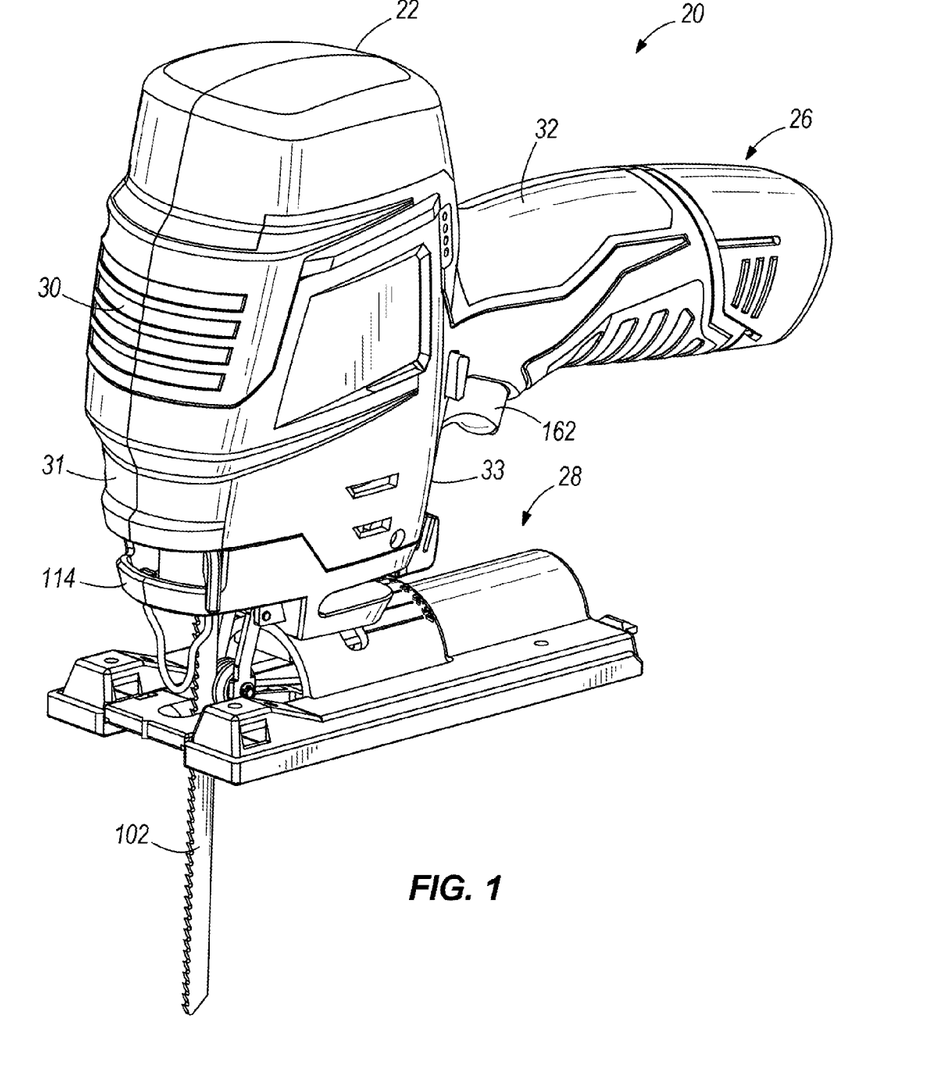
FIG. 1 is a perspective view of a jigsaw according to one embodiment of the invention.
Figure 2:
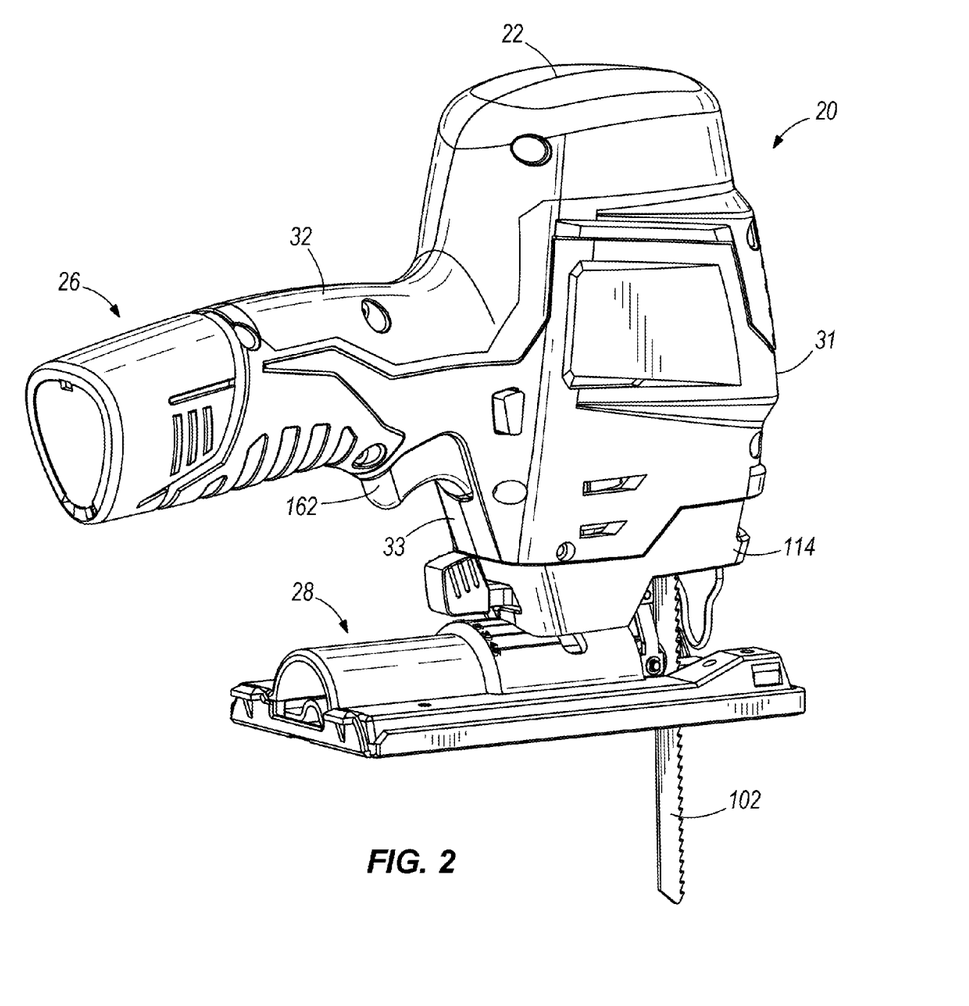
FIG. 2 is an alternative perspective view of the jigsaw shown in FIG. 1.
Figure 3:
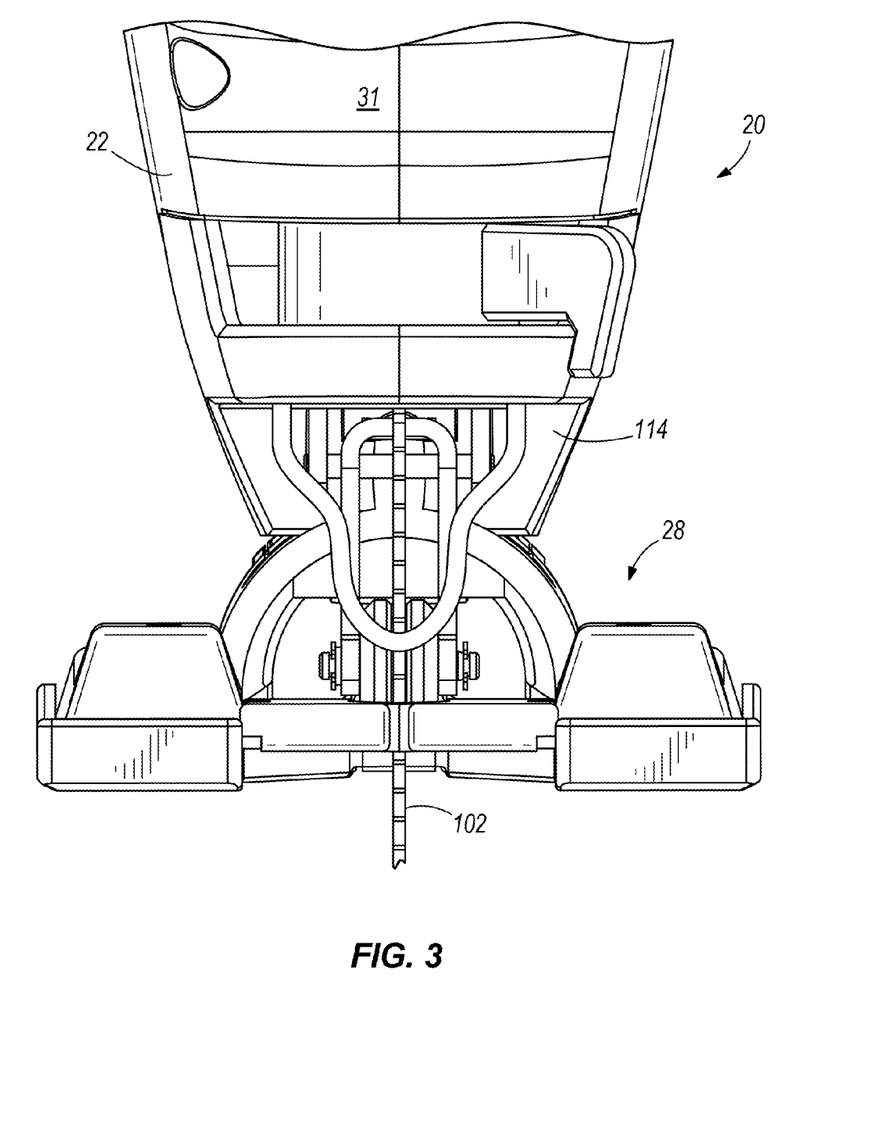
FIG. 3 is a partial front side view of the jigsaw shown in FIG. 1.
Figure 4:
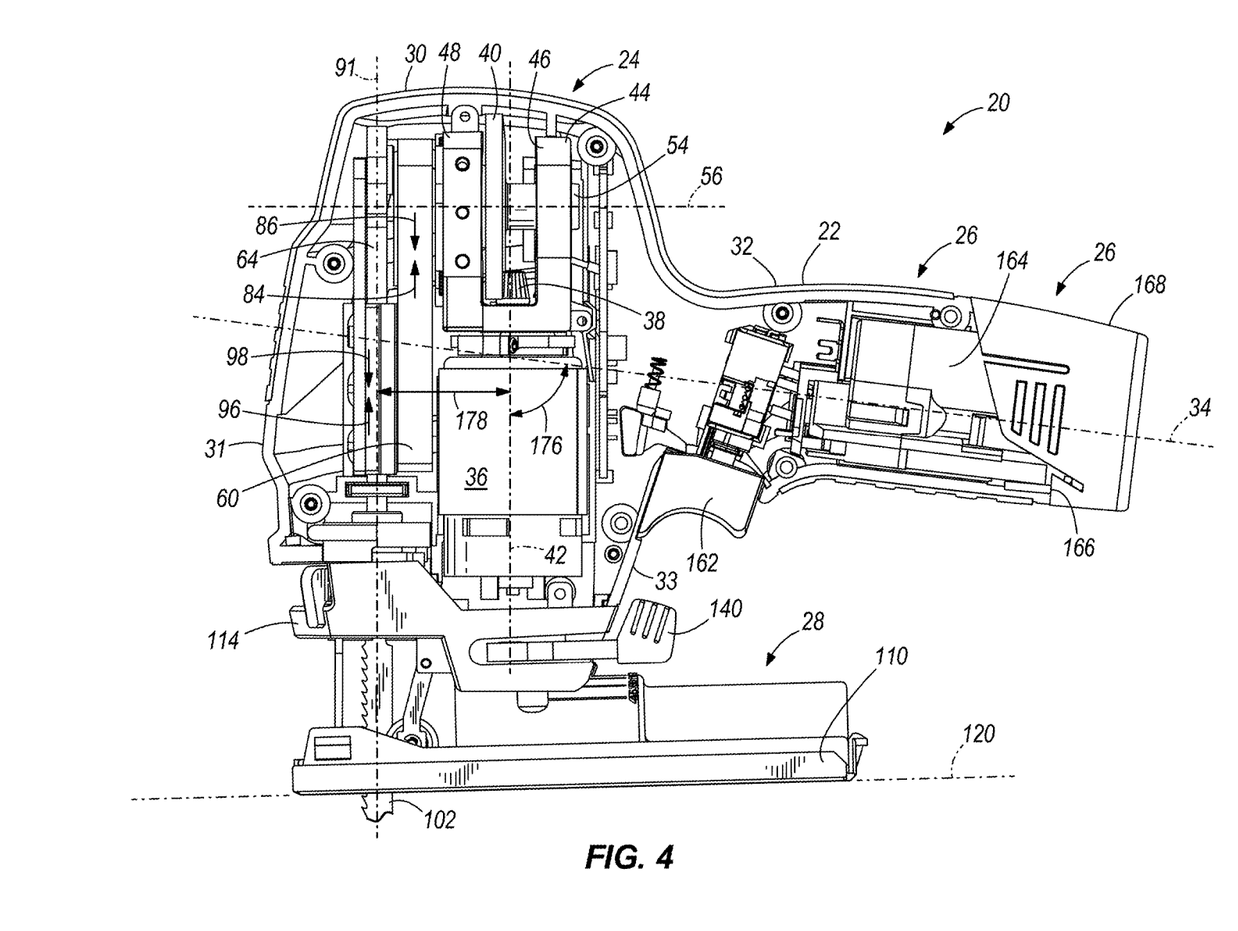
FIG. 4 is a left side view of the jigsaw shown in FIG. 1, with a portion of the housing removed.

FIGS. 1 and 2 illustrate a reciprocating saw 20 according to one embodiment of the invention. In the illustrated embodiment, the reciprocating saw 20 is a jigsaw. As shown in FIGS. 1 and 4, the jigsaw 20 includes a housing 22, a drive mechanism 24, a power supply 26, a shoe assembly 28, and a motor 36. The housing 22 includes a body portion 30 and a handle portion 32. The body portion 30 includes a forward end 31 and a rearward end 33. In the illustrated embodiment, the handle portion 32 extends from the rearward end 33 of the body portion 30. The handle portion 32, which includes a longitudinal axis 34 that extends generally centrally through the handle portion 32 along the length of the handle portion 32, provides a user with an area to grip and hold the jigsaw 20 during operation of the jigsaw 20.

Figure 5:
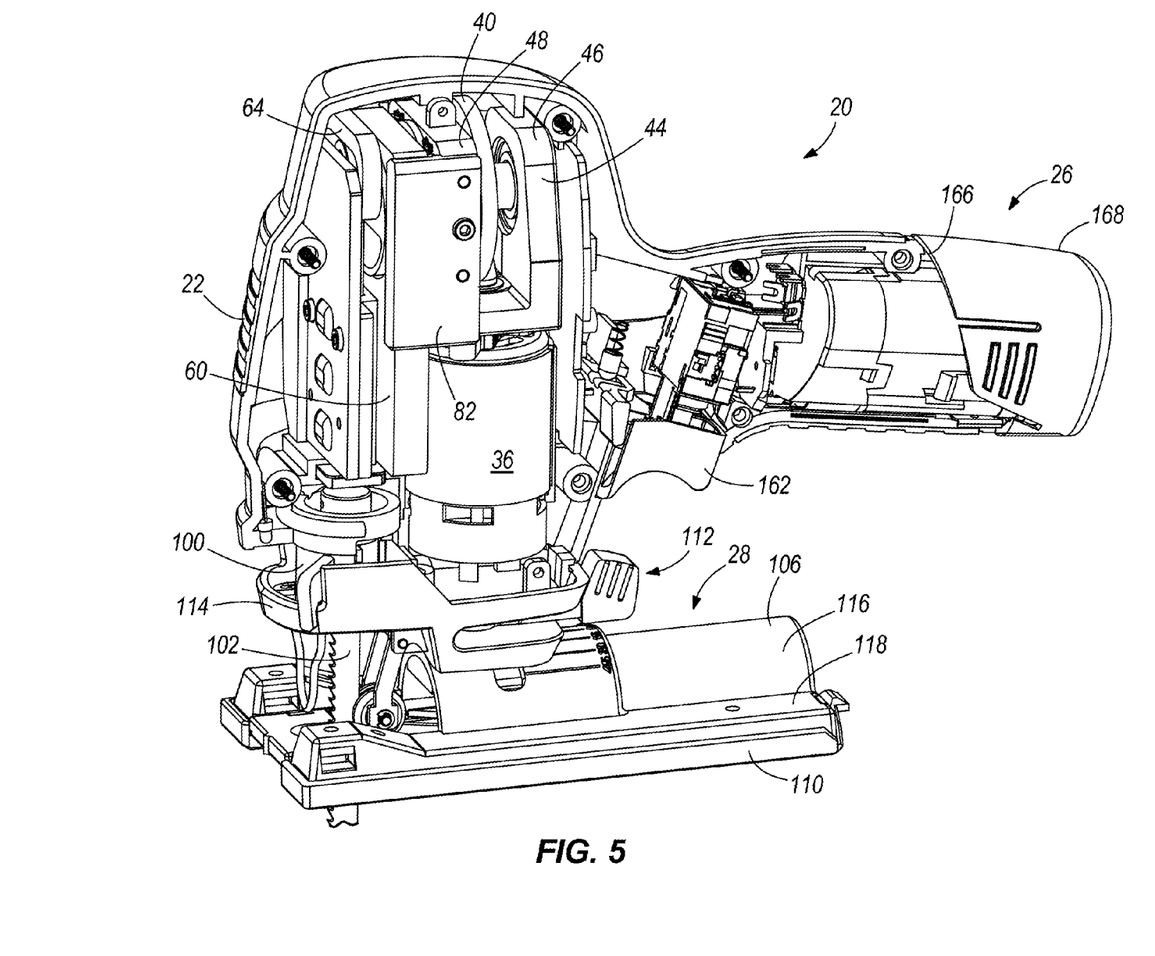
FIG. 5 is a perspective side view of the jigsaw shown in FIG. 1, with a portion of the housing removed.

As shown in FIGS. 4 and 5, the drive mechanism 24 and the motor 36 are both positioned within the body portion 30 of the housing 22 and located entirely forward of the handle portion 32. The motor 36 includes an output shaft 37 (FIG. 10) having a first end 37A and a second end 37B. The output shaft 37 defines a longitudinal axis 42 of the motor 36 that extends through the first and second ends 37A, 37B. As further discussed below, the motor 26 is vertically-oriented within the body portion 30 such that the output shaft 37 and the longitudinal axis 42 are generally perpendicular to a work piece during operation of the jigsaw 20.

Figure 6:
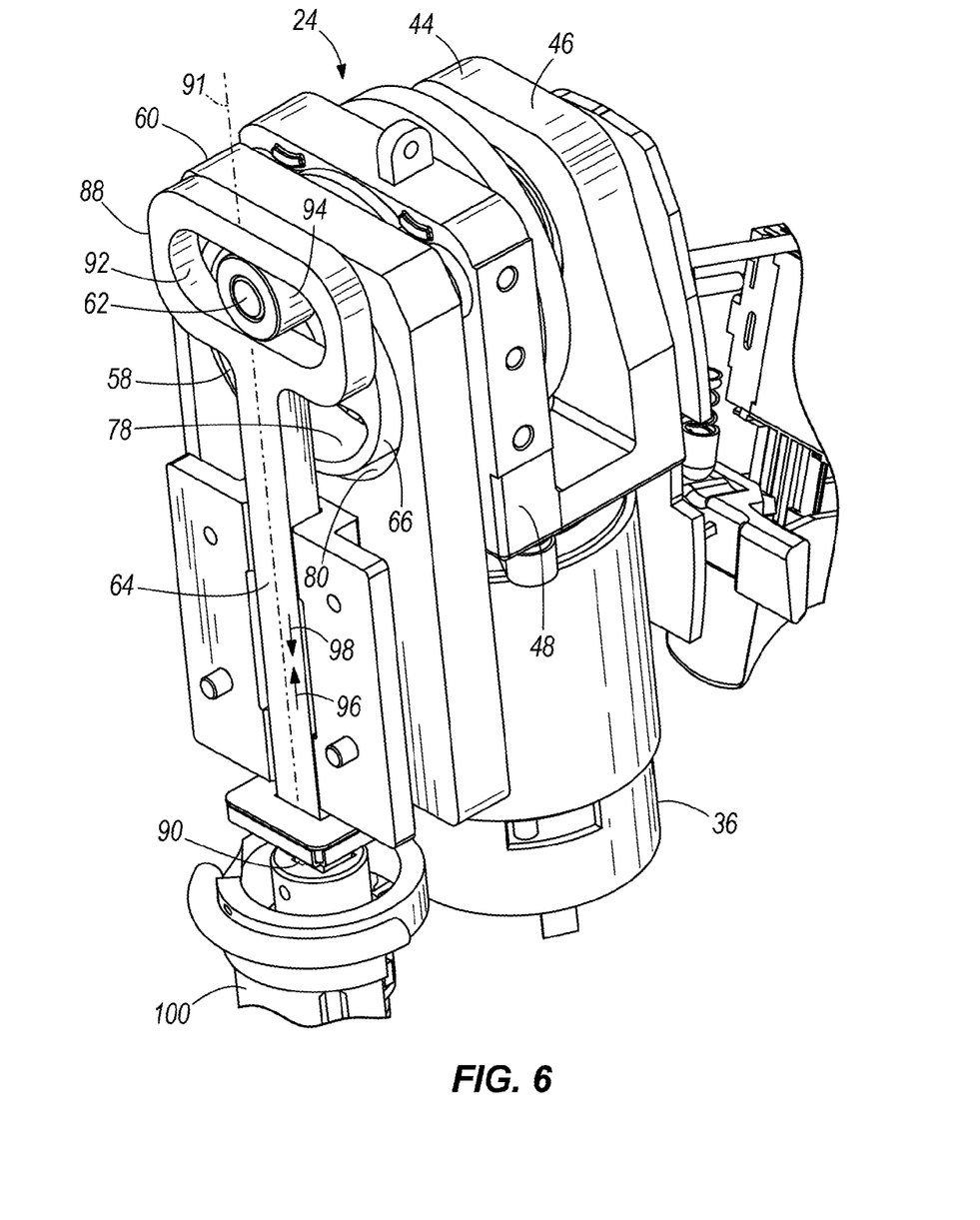
FIG. 6 is a partial perspective view of the jigsaw shown in FIG. 1, with the housing removed.
Figure 7:
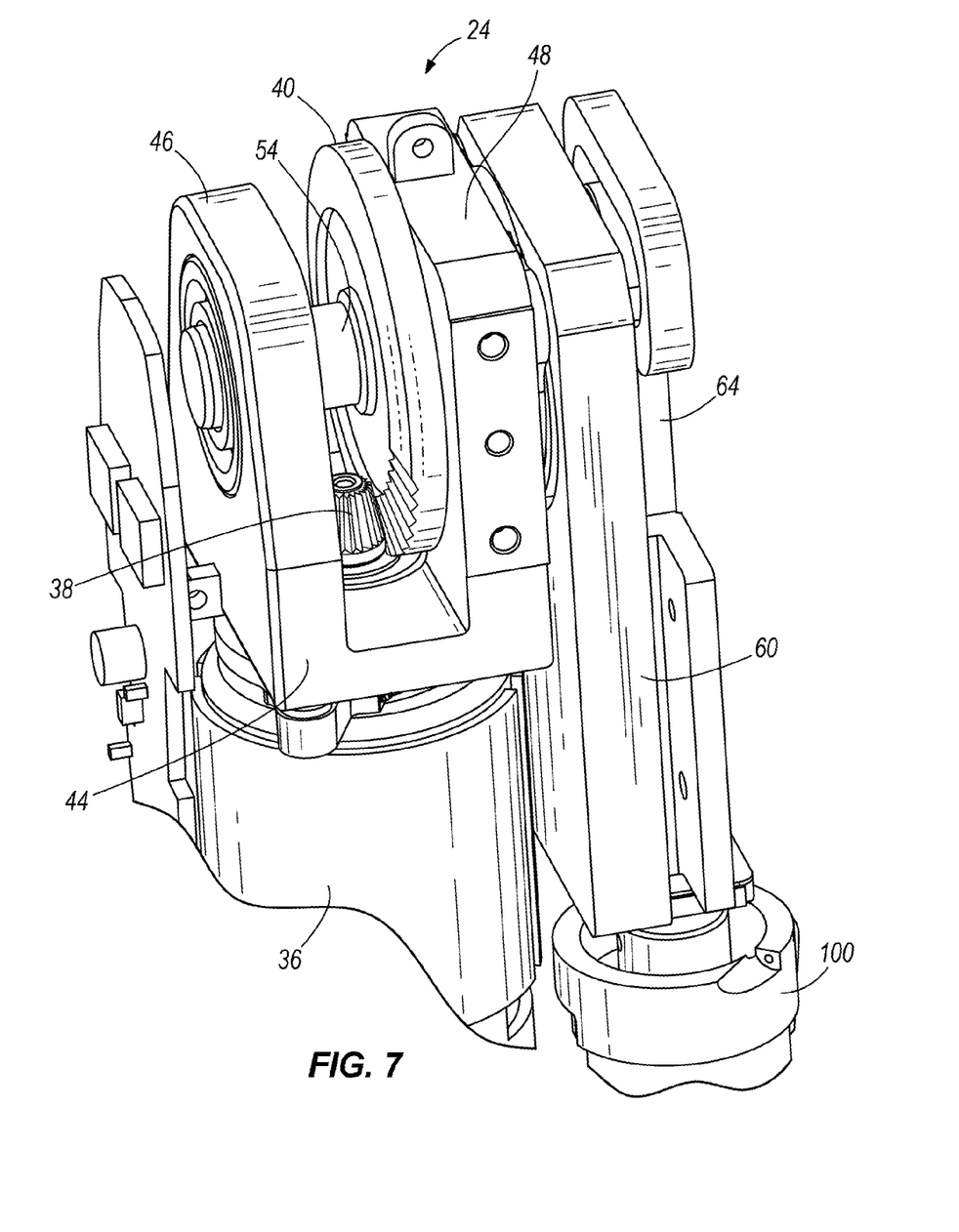
FIG. 7 is another partial perspective view of the jigsaw shown in FIG. 1, with the housing removed.

Referring to FIGS. 4 to 9, the drive mechanism 24 includes a drive or pinion gear 38 and a driven gear 40, both of which are bevel gears in the illustrated embodiment. The drive gear 38 is coupled to the first end 37A of the output shaft 37 of the motor 36. The motor 36 is operable to rotate the drive gear 38 about an axis of rotation (i.e., the longitudinal axis 42 of the motor 36). As shown in FIG. 7, the driven gear 40 intermeshes with the drive gear 38 such that the driven gear 40 is rotated by the drive gear 38.

Figure 9:
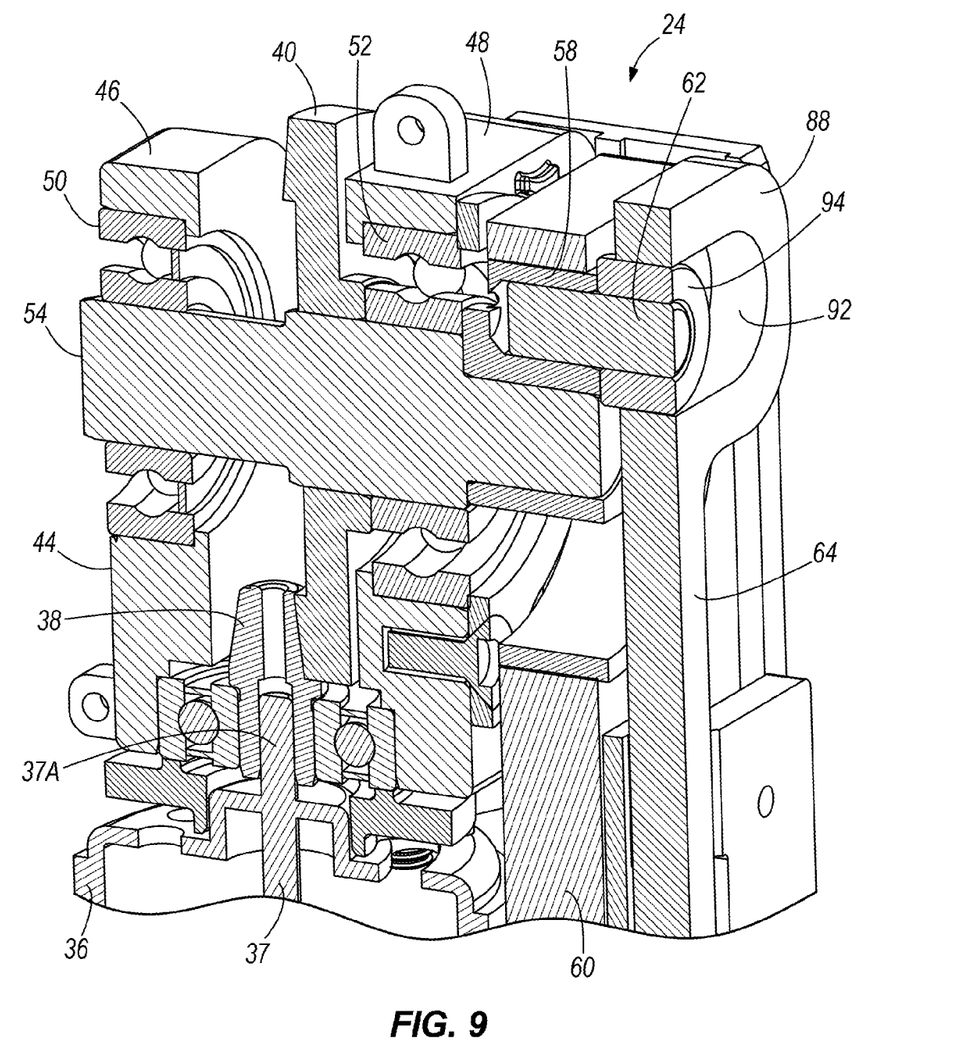
FIG. 9 is a cross-sectional view of a portion of the drive mechanism of the jigsaw shown in FIG. 1.

The drive mechanism 24 also includes a generally U-shaped frame 44 that has a first arm 46 and a second arm 48. The frame 44 is fixed to the housing 22 such that the frame 44 is inhibited from moving with respect to the housing 22. As shown in FIG. 9, a first bearing 50 is received and supported by the first arm 46, and a second bearing 52 is received and supported by the second arm 48. A drive shaft 54 extends from the first arm 46 to the second arm 48 and is rotatably supported by the bearings 50, 52 such that the shaft 54 can rotate with respect to the frame 44. The drive shaft 54 defines a longitudinal axis 56 (FIG. 4) that extends centrally through the drive shaft 54 along the length of the drive shaft 54. The drive shaft 54 rotates with the respect to the frame 44 about the longitudinal axis 56. The drive shaft 54 also extends through the driven gear 40. The driven gear 40 is secured to the drive shaft 54 between the arms 46, 48 of the frame 44 to rotate the shaft 54 with respect to the frame 44.

Figure 8:
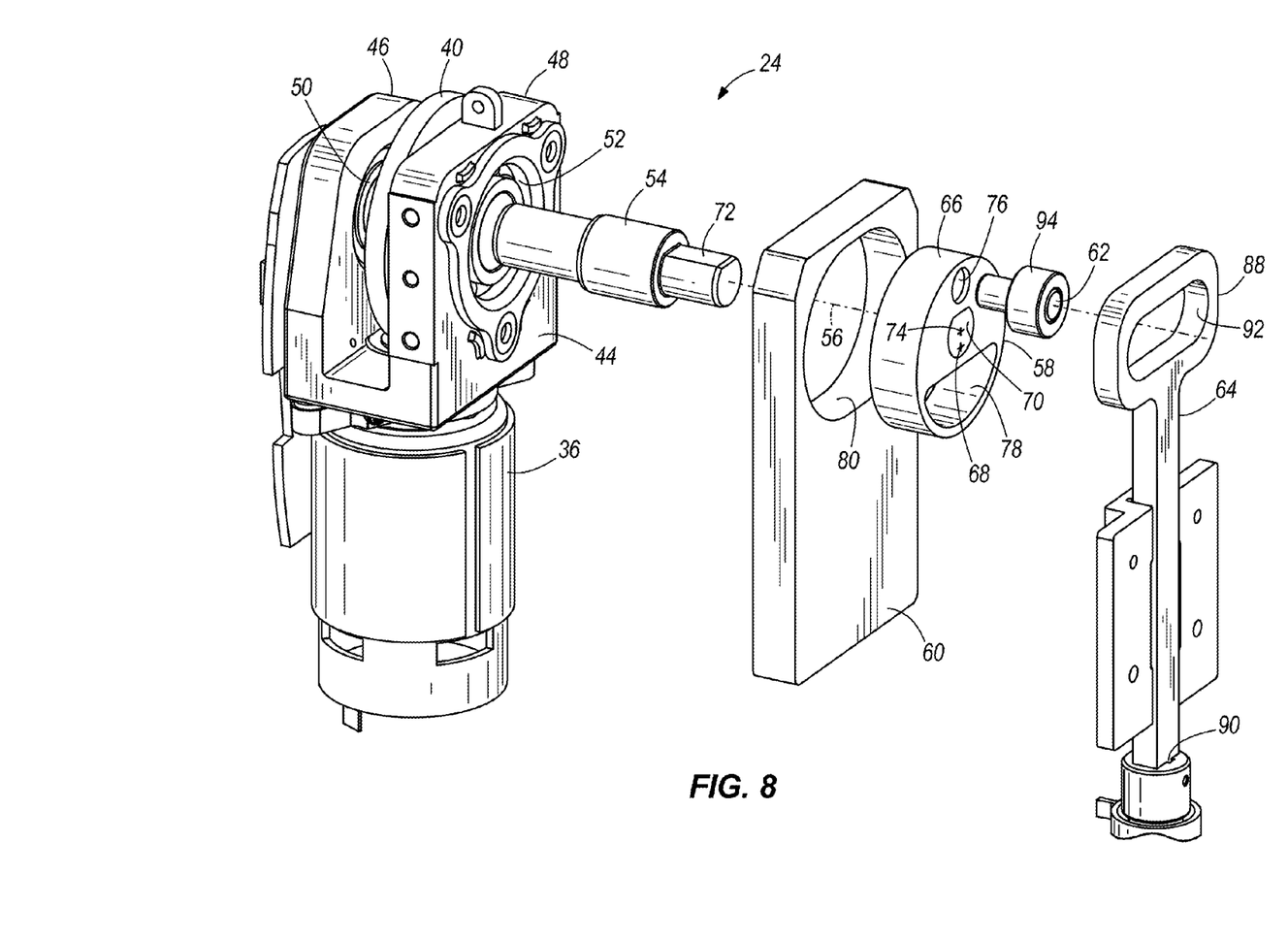
FIG. 8 is an exploded view of a drive mechanism of the jigsaw shown in FIG. 1.

Referring to FIGS. 6 and 8, the drive mechanism 24 further includes a drive wheel 58, a counterweight 60, a drive pin 62, and a spindle 64. As best seen in FIG. 8, the drive wheel 58 includes a generally cylindrical outer periphery 66 that extends around a central axis 68 of the drive wheel 58. The drive wheel 58 further includes a non-circular aperture 70 into which a non-circular end 72 of the drive shaft 54 extends to couple the drive wheel 58 to the drive shaft 54 for rotation with the shaft 54. The aperture 70 has a central axis 74 that is co-axial with the longitudinal axis 56 of the drive shaft 54. The drive wheel 58 rotates with the shaft 54 about the axes 56, 74, which are offset from the central axis 68 of the drive wheel 58. The drive wheel 58 further includes an aperture 76 that receives the drive pin 62 to couple the drive pin 62 to the drive wheel 58 for rotation with the drive wheel 58 about the axes 56, 74. An aperture 78 is formed through the drive wheel 58 to remove material from the drive wheel 58 and rotationally balance the weight of the drive wheel 58 for rotation about the axes 56, 74.

With continued reference to FIGS. 6 and 8, an aperture 80 extends through the counterweight 60. The aperture 80 is slightly non-round and receives the drive wheel 58 such that rotation of the drive wheel 58 within the aperture 80 is inhibited. Also, because the axis 74 about which the drive wheel 58 rotates with the shaft 54 is offset from the central axis 68 of the drive wheel 58, the drive wheel 58 is inhibited from rotating within the aperture 80 relative to the counterweight 60. As best seen in FIG. 5, two guides 82 (only one of which is visible in FIG. 5) are coupled to the second arm 48 of the frame 44 on opposite sides of the counterweight 60. The guides 82 guide and restrict the longitudinal reciprocating movement of the counterweight 60 in the direction of arrows 84 and 86 (FIG. 4) with respect to the frame 55.

Referring to FIGS. 6 and 8, the spindle 64 includes a first end portion 88 and a second end portion 90. The spindle 64 also defines a longitudinal axis 91 that extends generally centrally through the spindle 64 along the length of the spindle 64. An elongated aperture 92 extends through the first end portion 88 of the spindle 64. A roller 94 is received within the aperture 92. The roller 94 is coupled to the drive pin 62 for movement with the drive pin 62 about the axis 56, but the roller 94 can rotate about the drive pin 62. The aperture 92, the drive pin 62, and the roller 94 are configured such that together they form a scotch yoke mechanism that reciprocates the spindle 64 along the longitudinal axis 91 in the direction of arrows 96 and 98 (i.e., in a reciprocating motion) upon rotation of the drive shaft 54 about the axis 56.

Figure 10:
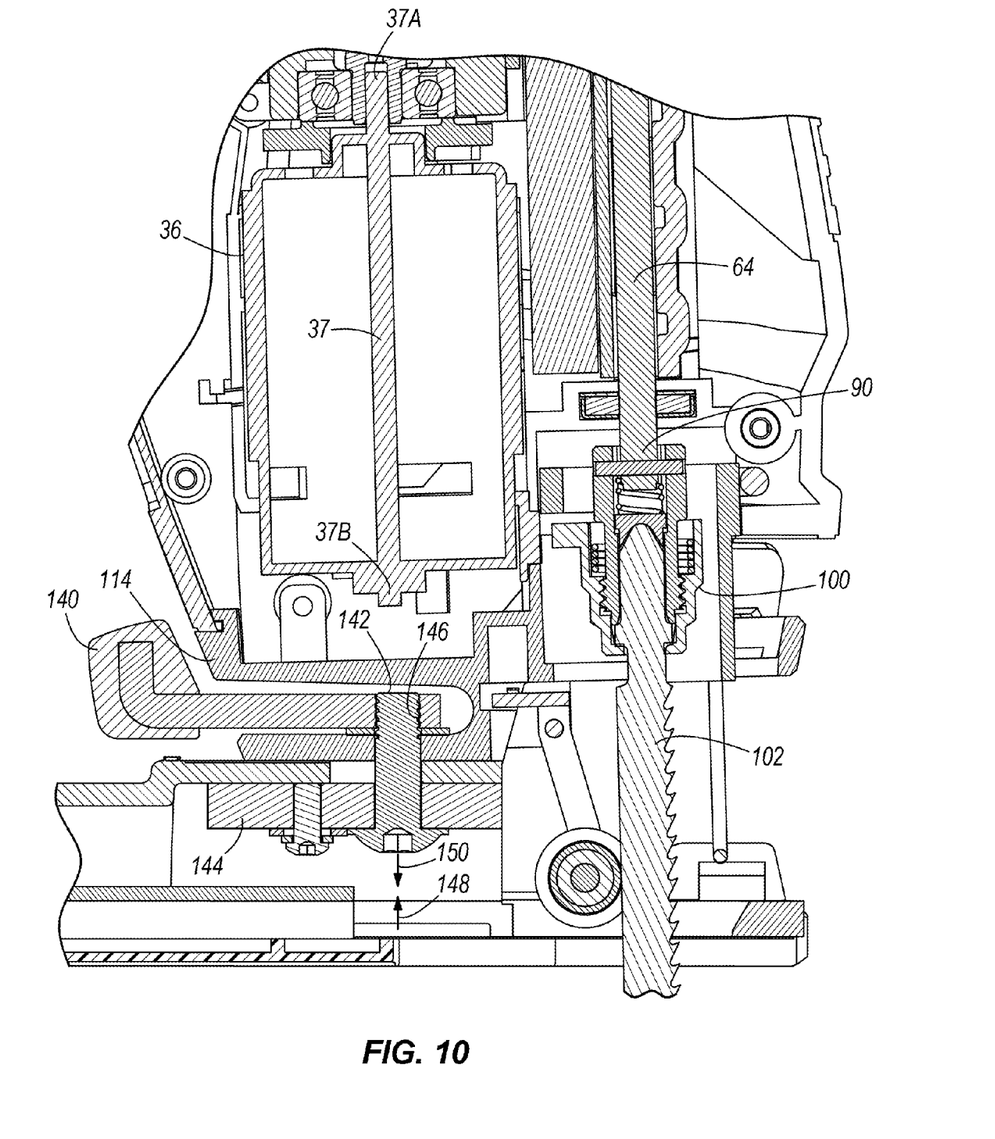
FIG. 10 is a cross-sectional view of a portion of the jigsaw shown in FIG. 1.

As shown in FIG. 10, a blade clamp mechanism 100 is coupled to the second end portion 90 of the spindle 64, and adjacent the second end 37B of the output shaft 37 of the motor 36. That is, the drive mechanism 24 and the motor 36 are arranged in a U-turn configuration such that the blade clamp mechanism 100 is positioned closer to the second end 37B of the motor 36 (the non-output end of the motor 36) than the first end 37A of the motor 36 (the output end of the motor 36). The blade clamp mechanism 100 is configured to removably receive and secure a saw blade, or other output tool suitable for reciprocation, to the spindle 64. In the illustrated embodiment, the clamp mechanism 100 receives a jigsaw blade 102 to couple the blade 102 to the spindle 64 for reciprocation with the spindle 64.

As shown in FIGS. 4 and 5, the shoe assembly 28 is coupled to the body portion 30 of the housing 22 between the forward end 31 and the rearward end 33. Referring to FIGS. 11 to 14, the illustrated shoe assembly 28 includes a frame 106, a base plate 108, an anti-marring pad 110, and a clamp assembly 112. The clamp assembly 112 clamps the shoe assembly 28 to a base 114 of the jigsaw housing 22. The frame 106 includes a generally semi-cylindrical portion 116 and two supports 118 that extend along ends of the semi-cylindrical portion 116 to support the jigsaw 20 on a top plane of a work piece 120 (FIG. 4). In one embodiment, the frame 106 is formed from aluminum, but in other embodiments, the frame 106 can be formed from other suitable materials, such as steel.

Figure 13:
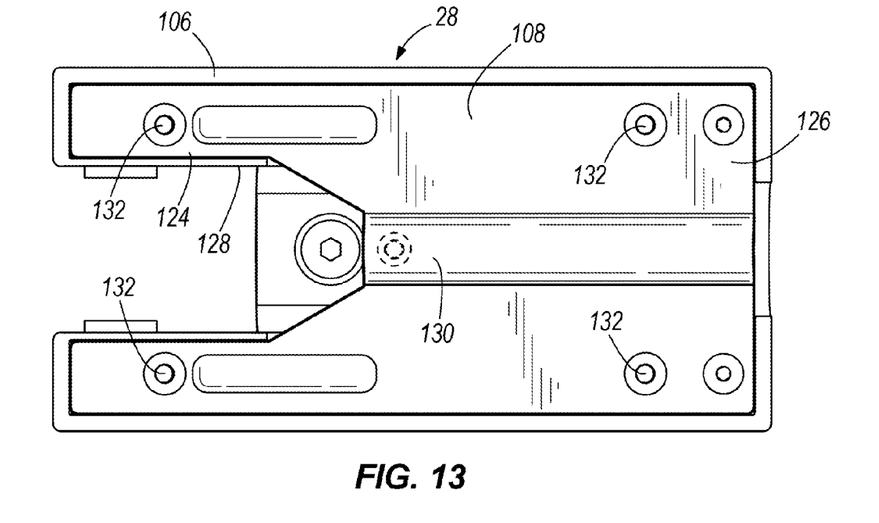
FIG. 13 is a bottom side view of the shoe assembly of the jigsaw of FIG. 1.

The base plate 108 is coupled to the bottom of the frame 106 and provides additional structural support to the frame 106. The base plate 108 also provides additional surface area for the shoe assembly 28 to contact the work piece 120 (FIG. 4). The base plate 108 includes a forward end portion 124 and a rearward end portion 126. An opening 128 is located at the forward end portion 124 to provide sufficient clearance for the blade 102 to extend through the base plate 108. The base plate 108 defines a generally semi-cylindrical chip channel 130 that is in communication with the opening 128. The chip channel 130 extends continuously from the opening 128 to the rearward end portion 126 of the base plate 108 to direct saw dust, cutting chips, or other debris out of the opening 128 and away from the saw blade 102 (FIG. 10). The chip channel 130 is continuous in that no other structures (aside from the anti-marring pad 110) obstruct the shape or size of the channel 130 between the opening 128 and the rearward end portion 126. As shown in FIG. 13, the base plate 108 further includes apertures 132 that receive fasteners, such as screws or the like, to couple the base plate 108 to the frame 106. In embodiments where the frame 106 is made from aluminum, the base plate 108 can be made from steel. In other embodiments, the base plate 108 can be made from other suitable materials, including aluminum.

Figure 12:
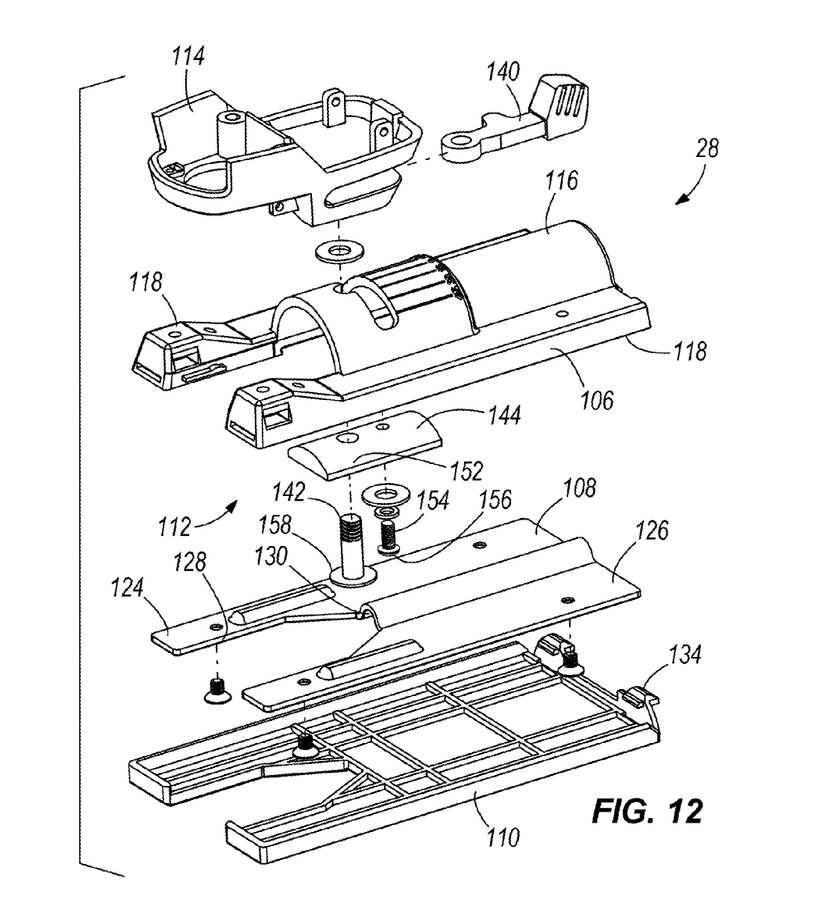
FIG. 12 is an exploded view of the shoe assembly of the jigsaw of FIG. 1.
Figure 14:
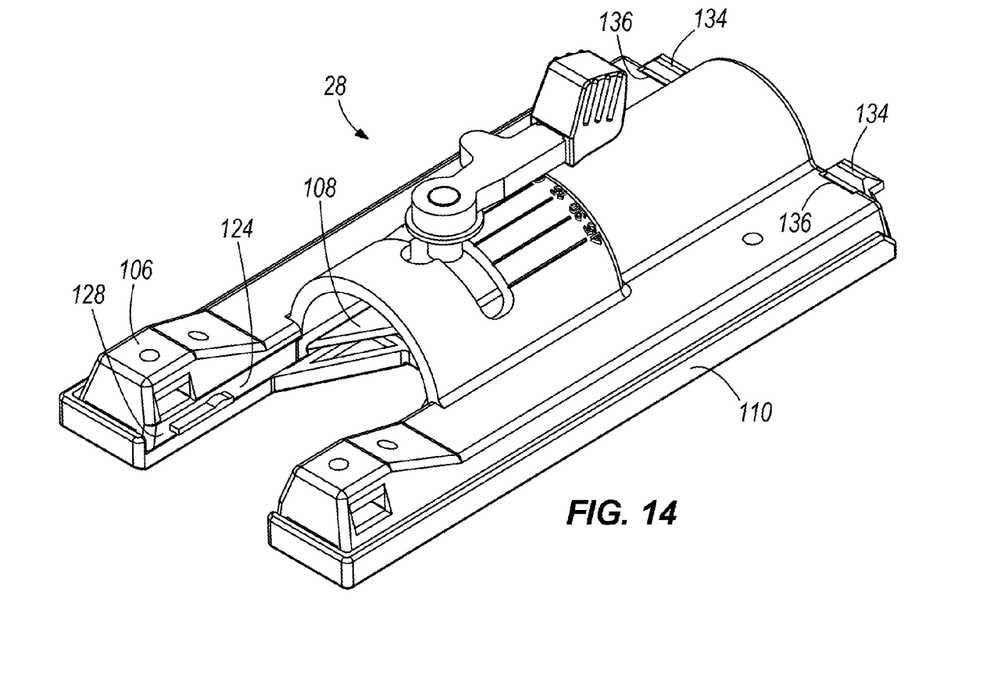
FIG. 14 is a perspective view of the shoe assembly of the jigsaw of FIG. 1.

Referring to FIGS. 12 and 14, the anti-marring pad 110 can be removably coupled to the frame 106 and the base plate 108 to provide a smooth and non-marring support for the jigsaw 20 on the work piece 120 (FIG. 4). The pad 110 includes tabs 134 and hooks 136 that are used to removably couple the pad 110 to the frame 106. Therefore, the jigsaw 20 can be used with the pad 110 or without the pad 110, in which case the base plate 108 would directly contact the work piece 120. In one embodiment, the pad 110 can include a semi-cylindrical chip channel similar the chip channel 130 of the base plate 108.

Figure 11:
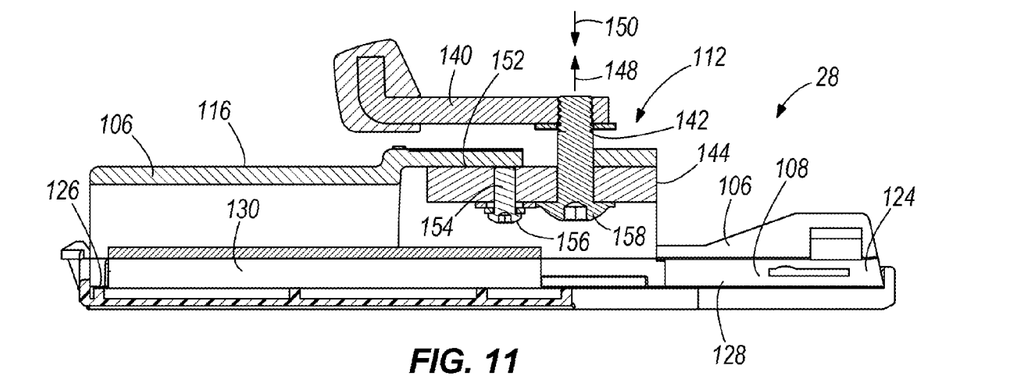
FIG. 11 is a cross-sectional view of a shoe assembly of the jigsaw of FIG. 1.

Referring to FIGS. 10 to 12, the clamp assembly 112 includes an actuator 140, a pivot 142, and a friction pad 144. The illustrated actuator 140 is a lever that is coupled to the pivot 142 for rotation with the pivot 142 such that the user can manually rotate the actuator 140 to rotate the pivot 142. In the illustrated embodiment, the pivot 142 is a threaded fastener that extends through a threaded aperture 146 of the jigsaw housing base 114. Accordingly, rotation of the pivot 142 by the actuator 140 causes the pivot 142 to move in the direction of arrows 148 and 150 with respect to the housing base 114.

The pad 144 is generally semi-cylindrical and includes an outer periphery 152 having a curvature that generally matches an inner surface curvature of the semi-cylindrical portion 116 of the frame 106. Accordingly, substantially all of the outer periphery 152 of the pad 144 can be brought into contact with the frame 106, thereby maximizing the effectiveness of the pad 144 to hold the shoe assembly 28 in the desired position, as will be discussed in more detail below. The pivot 142 extends through the pad 144 and is moved in the direction of arrows 148, 150 to increase and decrease a pressure applied to the frame 106 by the pad 144. A fastener 154, which includes a head 156, extends into the pad 144 adjacent a head 158 of the pivot 142. The fastener 154 can be rotated to move the fastener 154 in the direction of arrow 150 and out of engagement with the head 158, thereby allowing the user to rotate the pivot 142, via the head 158, relative to the actuator 140 and the pad 144 to adjust the clamping pressure applied by the clamp assembly 112. After the clamping pressure has been adjusted, the user can tighten the fastener 154 to bring the head 156 back into engagement with the head 158, as illustrated in FIGS. 10 and 11, to thereby inhibit the pivot 142 from rotating with respect to the pad 144 and the actuator 140.

Referring back to FIGS. 4 and 5, the power supply 26 is removably coupled to the housing 22 of the jigsaw 20. In the illustrated embodiment, the power supply 26 includes a battery pack 164 such that the jigsaw 20 is a cordless power tool. In other embodiments, the jigsaw 20 may be a corded power tool. The illustrated battery pack 164 is an insertable or tower-style battery pack 164 that is received in and supported at an end 166 of the handle portion 32 opposite the body portion 30. The battery pack 164 is shaped and sized to match the contour of the handle portion 32 such that an outer surface 168 of the battery pack 164 forms part of the handle portion 32 when the pack 164 is inserted into the housing 22.

The battery pack 164 is electrically coupled to the motor 36 via a trigger 162. The illustrated trigger 162 is a depressible button that may be actuated by the user to selectively power the motor 36. As shown in FIG. 4, the trigger 162 is supported by the handle portion 32 of the housing 22 such that the drive mechanism 24 and the motor 36 are also positioned forward of trigger 162. By moving the motor 36 out of the handle portion 32, the shape and size of the handle portion 32 can be altered to form a more comfortable grip for the user. For example, the illustrated handle portion 32 is shaped to be generally, but not perfectly, cylindrical. In such an embodiment, the handle portion 32 can have a diameter that is at most about two inches.

Referring to FIG. 4, in operation, the user sets the shoe assembly 28 on the work piece 120 and squeezes or actuates the trigger 162 to supply power from the battery pack 164 to the motor 36. When powered, the motor 36 rotates the drive gear 38 about the axis 42. Rotation of the drive gear 38 rotates the driven gear 40, and rotation of the driven gear 40 rotates the drive shaft 54. Rotation of the drive shaft 54 is transmitted to the drive wheel 58, which causes the drive pin 62 and the roller 94 to rotate about the longitudinal axis 56 of the drive shaft 54. Rotation of the drive pin 62 and the roller 94 about the axis 56 causes the spindle 64 to reciprocate in the direction of arrows 96 and 98. Such reciprocating motion of the spindle 64 causes a corresponding reciprocation of the blade 102 to cut the work piece 120. Also, rotation of the drive wheel 58 causes the counterweight 60 to reciprocate in the direction of arrows 86 and 84. When the spindle 64 is moving up (e.g., in the direction of arrow 96), the counterweight 60 is moving down in the opposite direction (e.g., in the direction of arrow 86) to offset the inertia created by the moving spindle 64 and reduce vibration of the saw 20.

Referring to FIGS. 4 and 13, as the user moves the jigsaw 20 along the work piece 120 being cut, chips from the work piece 120 are created by the reciprocating blade 102. When the anti-marring pad 110 is not being used (i.e., not attached to the shoe assembly 28, as illustrated in FIG. 13), the chips are allowed to pass through the chip channel 130 of the base plate 108 such that the chips are not pushed forward with the base plate 108 as the base plate 108 moves along the work piece 120. As discussed above, although not illustrated, the pad 110 may include a similar chip channel such that chips can also pass through the chip channel of the pad 110 when the pad 110 is being used (as illustrated in FIG. 4).

Figure 15:
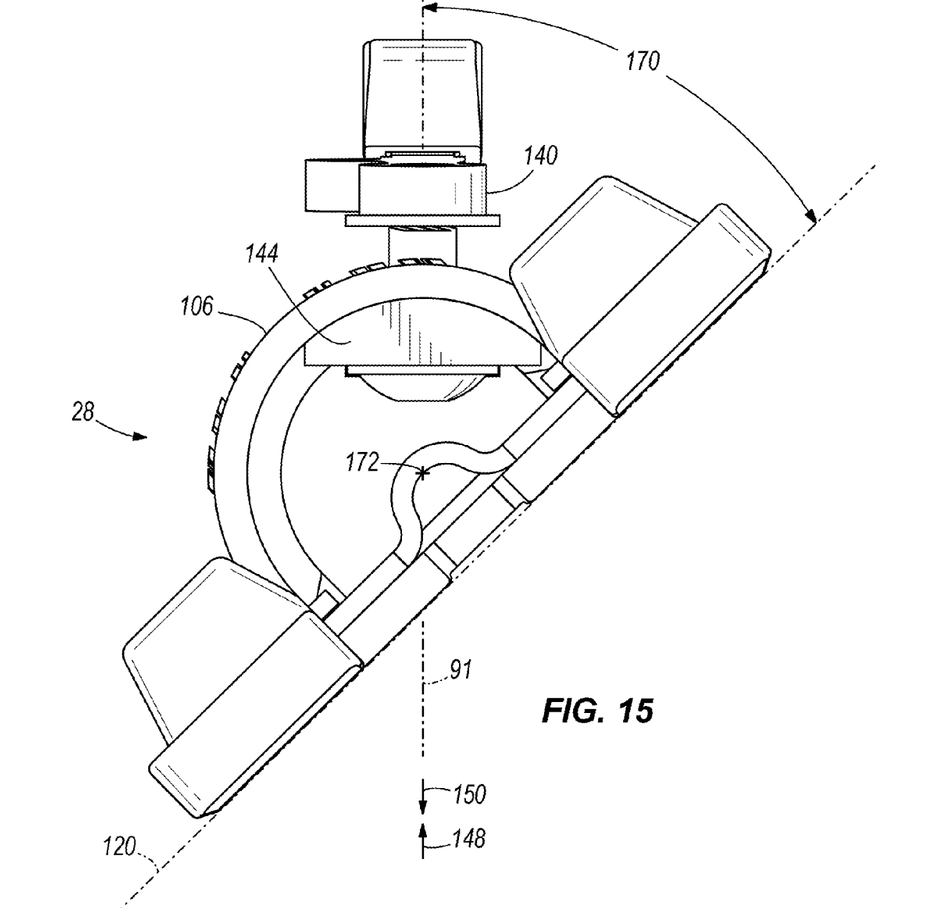
FIG. 15 is a front side view of the shoe assembly of the jigsaw of FIG. 1.

Referring to FIGS. 4 and 15, the user can adjust an angle 170 between the work piece 120 and the longitudinal axis 91 of the spindle 64 along which the blade 102 reciprocates. Changing the angle 170 adjusts a cutting angle of the blade 102 relative to the work piece 120. In FIGS. 4 and 5, the angle 170 is approximately 90 degrees such that the blade 120 performs a perpendicular cut in the work piece 120, while in FIG. 15 the angle 170 is approximately 45 degrees such that the blade 120 performs a beveled cut in the work piece 120. In the illustrated embodiment, the angle 170 can be adjusted to any angle between about 45 degrees and about 135 degrees. To adjust the angle 170, the user rotates the actuator 140 to move the pad 144 in the direction of arrow 150 to release the clamping pressure by the pad 144 on the frame 106. Then, the user can rotate the frame 106 about an axis 172 to position the frame 106 at the desired angle 170. With the frame 106 in the desired position, the user rotates the actuator 140 to move the pad 144 in the direction of arrow 148 to reapply a clamping pressure to the frame 106 and retain the frame 106 at the desired angle 170.

As shown in FIG. 4, the U-turn configuration of the drive mechanism 24 and the motor 36 orients the motor 36 generally vertically within the housing 22. In particular, the longitudinal axis 42 of the motor 36 (which is also the axis of rotation of the drive gear 38) is generally parallel to the longitudinal axis 91 of the spindle 62 along which the saw blade 102 is reciprocated. The motor axis 42, however, is spaced apart a relatively short distance 178 from the spindle axis 91 such that the axes 42, 91 are not coaxial. When the shoe assembly 28 is angled for the saw blade 120 to perform a perpendicular cut (i.e., when the angle 170 (FIG. 15) is 90 degrees), the motor axis 42 and the spindle axis 62 are also generally perpendicular to a plane defined by a lower surface of the shoe assembly 28, while the axis 56 of the drive shaft is generally parallel to that plane. The plane defined by the lower surface of the shoe assembly 28 is depicted with the same line that identifies the work piece 120 in the drawings. Such a U-turn arrangement creates a more compact jigsaw 20 compared to saws where the motor is perpendicular to or inline with the drive mechanism 24. In addition, such a configuration positions the motor 36 forward of the rearward end portion 126 of the shoe assembly 28 such that the drive mechanism 24 and the motor 36 are located entirely, or nearly entirely, within a periphery defined by the shoe assembly 28 when viewed from above. Furthermore, such a configuration positions the weights of the drive mechanism 24 and the motor 36 in a desirable position above the shoe assembly 28, providing a well-balanced saw that is easy to use.

The handle portion 32 of the housing 22 extends away from body portion 30 so as to not interfere with the compact configuration of the drive mechanism 24 and the motor 36. The illustrated handle portion 32 extends from the rearward end 33 of the body portion 30 at a height between the drive shaft axis 56 and the plane defined by the lower surface of the shoe assembly 28. In addition, the longitudinal axis 34 of the handle portion 32 is oriented at an angle 176 relative to the motor axis 42 and the spindle axis 91. In the illustrated embodiment, the angle 176 is about 85 degrees. In other embodiments, the angle 176 can be between about 60 degrees and about 120 degrees. Such a configuration positions a user's hand in a more comfortable position to grasp and operate the jigsaw 20.

Various features and advantages of the invention are set forth in the following claims.

The invention claimed is:

1. A jigsaw comprising:
    a housing including a body portion and a handle portion, the body portion having a forward end and a rearward end;
    a motor including an output shaft having a first end and a second end, the first end extending outwardly from one side of the motor, the second end located adjacent an opposite side of the motor, the motor being positioned within the body portion of the housing and located forward of the handle portion;
    a drive mechanism including a drive gear coupled to the first end of the output shaft, a driven gear coupled to the drive gear, and a drive shaft coupled to the driven gear, the drive mechanism positioned within the body portion of the housing, the drive shaft configured to drive a saw blade in a reciprocating motion;
    a U-shaped frame including a first leg and a second leg supporting the drive shaft, wherein the driven gear is supported between the first leg and the second leg; and
    a shoe assembly coupled to the body portion of the housing between the forward end and the rearward end wherein the second end of the output shaft is closer than the first end of the output shaft to the shoe assembly.

2. The jigsaw of claim 1, wherein the motor and the drive mechanism are located entirely forward of the handle portion.

3. The jigsaw of claim 1, wherein the handle portion extends from the rearward end of the body portion.

4. The jigsaw of claim 1, further comprising a trigger supported by the handle portion and electrically coupled to the motor, wherein the motor is located forward of the trigger.

5. The jigsaw of claim 1, wherein the drive mechanism includes a spindle that is driven by the motor in the reciprocating motion, and wherein the spindle is positioned within the housing adjacent the forward end of the body portion.

6. The jigsaw of claim 5, wherein the handle portion defines a first longitudinal axis and the spindle defines a second longitudinal axis, and wherein the first longitudinal axis is angled between about 60 degrees and about 120 degrees relative to the second longitudinal axis.

7. The jigsaw of claim 6, wherein the first longitudinal axis is angled about 85 degrees relative to the second longitudinal axis.

8. The jigsaw of claim 1, further comprising a power supply electrically coupled to the motor, wherein the power supply is supported by the housing rearward of the motor.

9. The jigsaw of claim 8, wherein the power supply is supported at an end of the handle portion opposite the body portion.

10. The jigsaw of claim 9, wherein the power supply is a battery pack, and wherein a portion of the battery pack is insertable into the end of the handle such that an outer surface of the battery pack forms part of the handle portion.

11. The jigsaw of claim 1, wherein the handle portion has a diameter, and wherein the diameter is at most about two inches.

12. The jigsaw of claim 1, further comprising:
    a clamp mechanism coupled to the spindle adjacent the second end of the output shaft, the clamp mechanism configured to receive the saw blade.

13. The jigsaw of claim 1, wherein the motor defines a longitudinal axis, wherein the shoe assembly includes a lower surface that is configured to support the jigsaw on a work piece and that defines a plane, and wherein the longitudinal axis of the motor is perpendicular to the plane.

14. The jigsaw of claim 13, wherein the shoe assembly is pivotally coupled to the body portion of the housing to adjust a cutting angle of the saw blade, and wherein the longitudinal axis of the motor is perpendicular to the plane when the shoe assembly is positioned to perform a perpendicular cut with the saw blade.

15. The jigsaw of claim 1, wherein the shoe assembly includes a base plate having a forward end portion and a rearward end portion, wherein the forward end portion includes an opening that provides clearance for the saw blade, and wherein the base plate defines a chip channel extending continuously from the opening to the rearward end portion.

16. A jigsaw comprising:
    a housing including a body portion and a handle portion extending from the body portion, the handle portion having a longitudinal axis that extends parallel to a longest dimension of the handle portion;
    a motor positioned within the housing, the motor including an output shaft having a first end and a second end the first end extending outwardly from one side of the motor, the second end located adjacent an opposite side of the motor;
    a drive gear coupled to the first end of the output shaft;
    a spindle positioned within the housing, the spindle coupled to the drive gear such that the motor drives the spindle in a reciprocating motion; and
    a clamp mechanism coupled to the spindle closer to the second end of the output shaft than to the first end of the output shaft, the clamp mechanism configured to receive a saw blade to drive the saw blade in the reciprocating motion;
    wherein the longitudinal axis of the handle portion extends through the output shaft of the motor.

17. The jigsaw of claim 16, wherein the output shaft of the motor defines a first longitudinal axis, wherein the spindle defines a second longitudinal axis, and wherein the first longitudinal axis is parallel to the second longitudinal axis.

18. The jigsaw of claim 17, wherein the first longitudinal axis is spaced apart from the second longitudinal axis.

19. The jigsaw of claim 17, further comprising:
    a driven gear coupled to the drive gear for rotation with the drive gear;
    a drive shaft extending from the driven gear for rotation with the driven gear;

a drive wheel coupled to the drive shaft for rotation with the drive shaft about an axis; and a drive pin extending from the drive wheel, the drive pin being offset from the axis of the drive wheel.

20. The jigsaw of claim 19, wherein the spindle defines an elongated aperture that receives the drive pin, and wherein the drive pin drives the spindle in the reciprocating motion when the drive wheel is rotated.

21. The jigsaw of claim 19, wherein the drive shaft defines a third longitudinal axis that is perpendicular to the first and second longitudinal axes.

22. The jigsaw of claim 21, further comprising a U-shaped frame having a first arm and a second arm spaced apart from the first arm, wherein the U-shaped frame is fixed to the housing, and wherein the first and second arms support the drive shaft.

23. The jigsaw of claim 22, further comprising:
a first bearing coupled to the first arm of the U-shaped frame for receiving a portion of the drive shaft; and
a second bearing coupled to the second arm of the U-shaped frame for receiving another portion of the drive shaft.

24. The jigsaw of claim 17, further comprising a shoe assembly coupled to the housing, wherein the shoe assembly includes a lower surface that is configured to support the jigsaw on a work piece and that defines a plane, and wherein the first and second longitudinal axes are perpendicular to the plane.

25. A jigsaw comprising:
a housing including a body portion and a handle portion extending from the body portion, the handle portion having a first longitudinal axis that extends parallel to a longest dimension of the handle portion;
a motor including an output shaft having a first end and a second end, the motor being positioned within the body portion and defining a second longitudinal axis;
a drive mechanism positioned within the housing and including a drive gear, the drive gear being coupled to the first end of the output shaft, the drive mechanism configured to drive a saw blade in a reciprocating motion; and
a shoe assembly coupled to the housing, the shoe assembly including a lower surface configured to support the jigsaw on a work piece, the lower surface defining a plane;
wherein the second longitudinal axis of the motor is perpendicular to the plane, and wherein the second end of the output shaft is closer than the first end of the output shaft to the shoe assembly; and
wherein the first longitudinal axis of the handle portion extends through the output shaft of the motor.

26. The jigsaw of claim 25, wherein the drive mechanism includes a spindle defining a third longitudinal axis, and wherein the third longitudinal axis of the spindle is parallel to the second longitudinal axis of the motor.

27. The jigsaw of claim 25, wherein the body portion supports the motor and the drive mechanism, wherein the body portion has a forward end adjacent the drive mechanism, and wherein the handle portion extends rearwardly from the body portion.

28. The jigsaw of claim 27, wherein the first longitudinal axis of the handle portion is angled between about 60 degrees and about 120 degrees relative to the second longitudinal axis of the motor.

29. The jigsaw of claim 28, wherein the first longitudinal axis of the handle portion is angled about 85 degrees relative to the second longitudinal axis of the motor.

30. The jigsaw of claim 27, further comprising a power supply electrically coupled to the motor, wherein the power supply is supported at an end of the handle portion opposite the body portion.

31. The jigsaw of claim 25, wherein the shoe assembly is pivotally coupled to the housing to adjust a cutting angle of the saw blade, and wherein the longitudinal axis of the motor is perpendicular to the plane when the shoe assembly is positioned to perform a perpendicular cut with the saw blade.

32. The jigsaw of claim 16, wherein the handle portion supports a trigger and is configured to be grasped by a user to actuate the trigger.

33. The jigsaw of claim 16, wherein the longitudinal axis of the handle portion extends transverse to the output shaft of the motor.

34. The jigsaw of claim 25, wherein the handle portion supports a trigger and is configured to be grasped by a user to actuate the trigger.

35. The jigsaw of claim 25, wherein the longitudinal axis of the handle portion extends transverse to the output shaft of the motor.

* * * * *